US009140782B2

(12) United States Patent
Alberth, Jr. et al.

(10) Patent No.: US 9,140,782 B2
(45) Date of Patent: Sep. 22, 2015

(54) INTER-VEHICLE ALERT SYSTEM WITH NAGABLE VIDEO LOOK AHEAD

(75) Inventors: William P. Alberth, Jr., Prairie Grove, IL (US); Dean E. Thorson, Grayslake, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 214 days.

(21) Appl. No.: 13/556,081

(22) Filed: Jul. 23, 2012

(65) Prior Publication Data

US 2014/0022108 A1    Jan. 23, 2014

(51) Int. Cl.
*G01S 13/86* (2006.01)
*G01S 13/93* (2006.01)
(Continued)

(52) U.S. Cl.
CPC ............... *G01S 13/04* (2013.01); *G01S 13/08* (2013.01); *G01S 13/867* (2013.01); *G01S 13/931* (2013.01);
(Continued)

(58) Field of Classification Search
CPC ....... G01S 13/86; G01S 13/867; G01S 13/88; G01S 13/91; G01S 13/93; G01S 13/02; G01S 13/04; G01S 13/08; G01S 13/931; G01S 2013/936; G01S 2013/9325; G01S 2013/9371; G01S 2013/9375; G01S 2013/9378; G01S 2013/9382; G01S 2013/9385; H04N 7/002; H04N 7/04; H04N 7/045; H04N 7/06; H04N 7/14; H04N 7/18; H04N 7/181; H04N 7/183; H04N 7/185; H04N 7/188; H04N 7/20
USPC ......... 342/27, 28, 52, 55, 58–60, 70–72, 118, 342/128–133, 175, 195, 22; 348/143, 148, 348/149, 552, 14.01, 14.08, 61, 160, 723, 348/724; 725/73; 370/0.254, 464, 480; 340/901, 902, 425.5, 435, 436; 332/149, 151; 379/67.1, 88.13, 242, 379/310
See application file for complete search history.

(56) References Cited

U.S. PATENT DOCUMENTS 2,542,182 A * 2/1951 Crump ............................ 342/60
2,578,939 A * 12/1951 Moran, Jr. ..................... 348/160
(Continued)

FOREIGN PATENT DOCUMENTS

DE    102006016807 A1    10/2007
DE    102006055344 A1    5/2008
(Continued)

OTHER PUBLICATIONS

A Review of Automotive Radar Systems—Devices and Regulatory Frameworks SP Apr. 2001.
(Continued)

*Primary Examiner* — Bernarr Gregory
(74) *Attorney, Agent, or Firm* — Morris & Kamlay LLP (57) ABSTRACT

An apparatus includes a video encoder, a camera and radio frequency modulation circuitry. The radio frequency modulation circuitry is operative to modulate a radar signal to include video data. A radar transmitter is operatively coupled to the radio frequency modulation circuitry, and is operative to transmit a radar signal including the video data. The apparatus may also include radio frequency demodulation circuitry and a video decoder. The video decoder is operative to decode video data contained in a radar signal demodulated by the radio frequency demodulation circuitry. An inter-vehicle alert system controls the camera to initiate capturing video data which includes the video data. A method of operation modulates a radar signal to include at least a portion of the video data captured in response to detecting an obstruction, and transmits the radar signal to a second vehicle via an antenna array oriented at the moving vehicle's rear.

20 Claims, 8 Drawing Sheets

(51) Int. Cl.
*G01S 13/04* (2006.01)
*G01S 13/08* (2006.01)
*G01S 13/00* (2006.01)

(52) U.S. Cl.
CPC ... *G01S 2013/936* (2013.01); *G01S 2013/9325* (2013.01); *G01S 2013/9375* (2013.01); *G01S 2013/9378* (2013.01); *G01S 2013/9382* (2013.01); *G01S 2013/9385* (2013.01)

(56) References Cited

U.S. PATENT DOCUMENTS

| | | | |
|---|---|---|---|
| 2,710,343 A * | 6/1955 | Thompson | 370/480 |
| 3,181,153 A * | 4/1965 | Cella | 342/59 |
| 3,775,765 A * | 11/1973 | Di Piazza et al. | 342/22 |
| 4,367,485 A * | 1/1983 | Hemmie | 348/14.08 |
| 4,475,242 A * | 10/1984 | Rafal et al. | 725/73 |
| 5,463,357 A * | 10/1995 | Hobden | 332/151 |
| 5,960,074 A * | 9/1999 | Clark | 379/310 |
| 6,081,223 A * | 6/2000 | Kitahara et al. | 342/70 |
| 6,466,655 B1 * | 10/2002 | Clark | 379/88.13 |
| 6,615,137 B2 | 9/2003 | Lutter et al. | |
| 7,100,190 B2 * | 8/2006 | Johnson et al. | 348/148 |
| 7,102,536 B2 * | 9/2006 | Scholz | 340/902 |
| 7,254,482 B2 * | 8/2007 | Kawasaki et al. | 340/435 |
| 7,443,284 B2 * | 10/2008 | Curtis | 340/425.5 |
| 7,532,130 B2 * | 5/2009 | Curtis | 340/902 |
| 7,748,021 B2 | 6/2010 | Obradovich | |
| 8,009,868 B2 * | 8/2011 | Abe | 348/148 |
| 8,184,161 B2 * | 5/2012 | Trapani | 348/148 |
| 8,345,098 B2 * | 1/2013 | Grigsby et al. | 348/148 |
| 8,363,102 B1 * | 1/2013 | Kadoch et al. | 348/148 |
| 8,368,755 B2 * | 2/2013 | Nishida et al. | 348/148 |
| 8,400,507 B2 * | 3/2013 | Grigsby et al. | 348/149 |
| 8,493,198 B1 * | 7/2013 | Vasquez et al. | 340/436 |
| 8,682,004 B2 * | 3/2014 | Grigsby et al. | 340/436 |
| 2004/0107042 A1 | 6/2004 | Seick | |
| 2008/0181132 A1 * | 7/2008 | Underhill et al. | 370/254 |
| 2009/0231158 A1 * | 9/2009 | Grigsby et al. | 340/902 |
| 2009/0231433 A1 | 9/2009 | Grigsby et al. | |
| 2009/0234859 A1 * | 9/2009 | Grigsby et al. | 707/10 |
| 2012/0095641 A1 | 4/2012 | Merk | |
| 2012/0169834 A1 * | 7/2012 | Grigsby et al. | 348/14.08 |

FOREIGN PATENT DOCUMENTS

| | | |
|---|---|---|
| EP | 1785744 A1 | 5/2007 |
| JP | 2000311300 A | 11/2000 |
| JP | 2002151934 A | 5/2002 |
| JP | 2005092415 A | 4/2005 |
| KR | 1020070110721 A | 11/2007 |
| KR | 101010522 B1 | 1/2011 |
| WO | 2010024722 A1 | 3/2010 |

OTHER PUBLICATIONS

Patent Cooperation Treaty, "PCT Search Report and Written Opinion of the International Searching Authority" for International Application No. PCT/US2013/051508 dated Oct. 24, 2013.

* cited by examiner

INTER-VEHICLE ALERT SYSTEM WITH NAGABLE VIDEO LOOK AHEAD

FIELD OF THE DISCLOSURE

The present disclosure is related to vehicle anti-collision systems employing radar, and to video systems.

BACKGROUND

Automobiles are more frequently incorporating anti-collision systems that utilize radio detection and ranging (radar) technology to detect obstructions at the front and possibly also at the sides and rear of a moving vehicle. The anti-collision systems may provide warnings to the vehicle driver or may take an active role in applying the vehicle brakes or adjusting the vehicle speed to avoid collisions.

Such vehicle radar systems in the United States may operate within frequency bands such as 46.7-46.9 GHz or 76.0-77.0 GHz per Federal Communications Commission (FCC) regulations for field disturbance sensors used as vehicle radar systems. The International Telecommunication Union (ITU) also provides recommendations for radio requirement aspects of "advanced vehicle control systems" which includes automotive radar as one such control system. In traffic, although such systems may provide warnings that a vehicle in front is getting too close, or is slowing down, such systems do not provide any information for obstructions that may be located one or more vehicles ahead and possibly around a curve in the road.

DETAILED DESCRIPTION

The disclosed embodiments disclose an inter-vehicle alert system that detects road obstructions and, in response, captures video and sends it to vehicles following behind in a line of traffic. The following vehicles are therefore notified of upcoming obstructions that they would not normally be able to detect or see until it may be too late to take evasive action or apply the brakes. Another aspect of the embodiments provides a navigable video "look ahead" system. A driver may obtain video from one or more leading vehicles to "look ahead" and view what is far ahead in a lane of traffic, thereby obtaining an "x-ray like" vision capability of seeing beyond a blockade of leading vehicles. Various other applications and advantages of the disclosed embodiments will become apparent to those of ordinary skill in view of the description provided herein.

Figure 1:
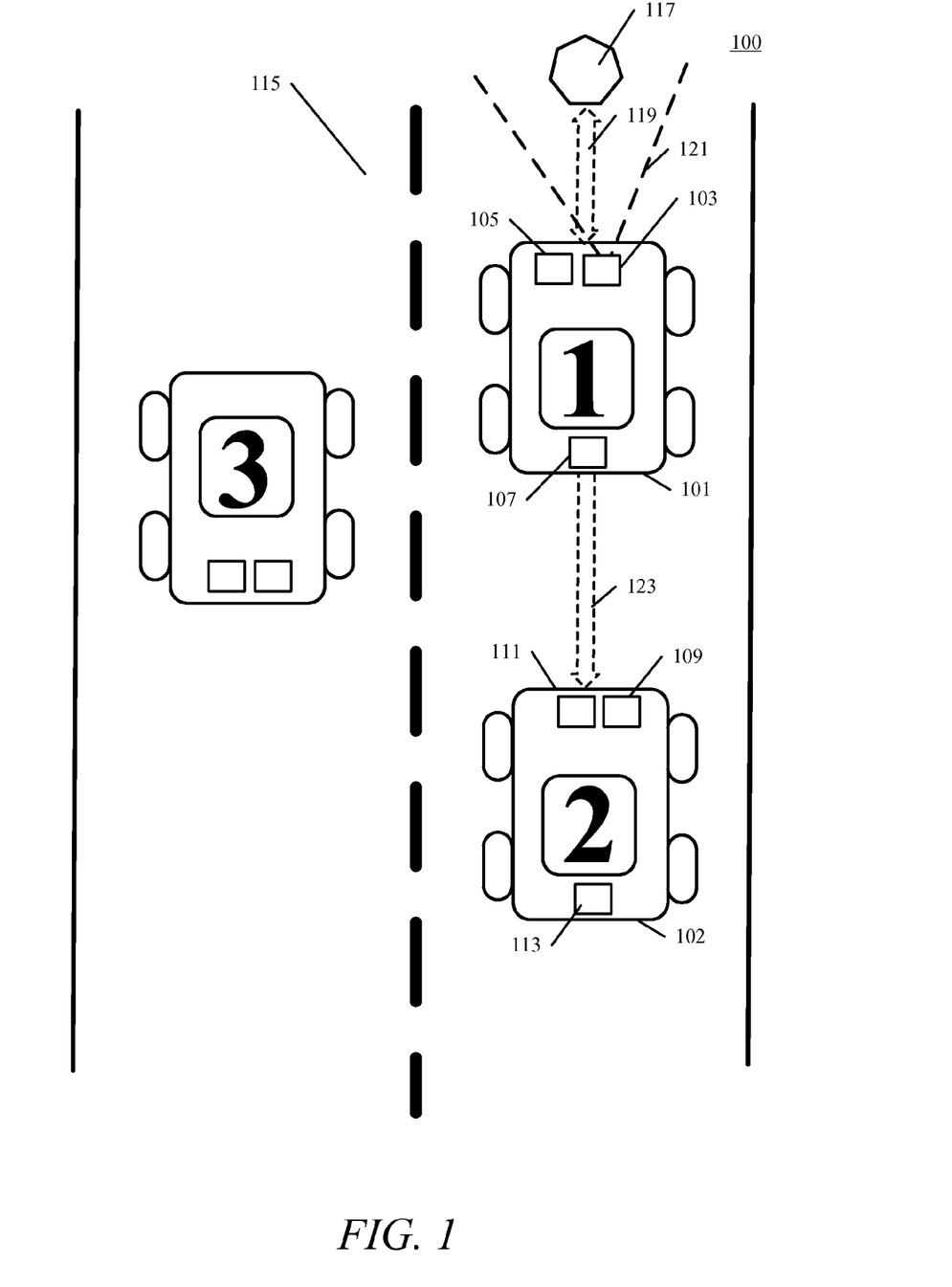
FIG. 1 is a diagram of vehicles in traffic where one of the vehicles encounters an obstruction in the road.

Turning now to the drawings wherein like numerals represent like components, FIG. 1 is a diagram of an example traffic pattern 100 with three vehicles numbered 1 through 3. The first and second vehicles are both shown headed in a direction toward the top of the diagram with the first vehicle 101 being located in front of the second vehicle 102. A third vehicle is shown headed in the opposite direction on the portion of the roadway separated by a median line 115. As the first vehicle 101 moves down the roadway it may encounter an obstruction 117, which may cause the driver of the first vehicle 101 to apply the brakes or otherwise swerve to avoid hitting the obstruction 117.

The first vehicle 101 includes a front radar system 105, a camera module 103, and a rear radar system 107. The front radar system 105 and rear radar system 107, may be separate radar systems, or may be a single radar system having a front facing antenna array and a rear facing antenna array with a common control system. The second vehicle 102 also has a front radar system 111, a camera 109, and a rear radar system 113. Hence, the location of the antenna arrays, front facing or rear facing need not be physically located in the front or rear, respectively. In some embodiments, the antenna arrays can be located on top of the vehicle, inside the vehicle, or on the side of the vehicle, for example.

In the example traffic pattern 100 of FIG. 1, the first vehicle 101 encounters an obstruction 117. The front radar system 105 sends a radar signal 119 at predetermined intervals in order to detect objects in front of the first vehicle 101. The first vehicle 101 sends the radar signal 119 which is reflected back from the obstruction 117 and received by the front radar system 105. The first vehicle 101 is therefore "aware" of the obstruction 117 and may provide alerts to the driver or take some other appropriate action such as automatically engaging the vehicle brakes. In accordance with an embodiment, an inter-vehicle alert system communicates with the front radar system 105 and, upon detecting the obstruction 117, actives the camera module 103 to obtain an image of the obstruction within the camera angle 121 of the camera module 103. The image captured by the camera module 103 may be a still image or may be a video image.

The second vehicle 102, which is located behind the first vehicle 101, also sends out an occasional radar signal at predetermined intervals from the front radar system 111. The first vehicle 101 has an image encoder or video encoder, and radio frequency modulation circuitry such that the first vehicle 101 may encode the image or video signal and modulate the radar signal, i.e. modulate the radar carrier, to include at least a portion of the image or a portion of the video, for example, at least one video data frame of a video image. The first vehicle 101 may then send a reverse radar signal 123 to the second vehicle 102, in order to transmit the image or video data. The second vehicle 102 receives the reverse radar signal 123 via the front radar system 111. The second vehicle 102 may then demodulate the received radar signal and decode the video data for display on an in-vehicle display system. The first vehicle 101 continues to send reverse radar signals 123 in order to send complete video information to the second vehicle 102. That is, the driver of the second vehicle is able to view the obstruction 117 via an in-vehicle display system using the video signal that is received from the first vehicle 101. The driver of the second vehicle 102 is, therefore, able to effectively see, i.e. "look ahead" to what the driver of the first vehicle 101 is seeing as he or she proceeds down the roadway. The embodiments provide, among other advantages, the advantage of eliminating sudden surprises that may occur in a traffic pattern caused by being unable to see what is in front of one or more vehicles up ahead. The sudden surprises can include obstructions and non-obstructions in a roadway. For example, some non-obstructions that are contemplated, but in no way exhaustive, include: traffic signage, traffic cops, animal crossings, surreptitious explosive devices, and potholes, for example. The embodiments also provide the advantage of a multi-vehicle system that operates to establish video communication in an ad-hoc manner (i.e. an ad-hoc video network). This feature is discussed in further detail below.

The rear radar system 107 of the first vehicle may avoid interfering with the front radar system 111 of the second vehicle 102, by sending the reverse radar signal 123 during a time interval in which the front radar system 111 of the second vehicle 102 is not transmitting. That is, the multi-vehicle system may take advantage of idle time between radar signal transmissions. The first vehicle 101 may initially detect a few of the radar signals sent from the second vehicle 102 in order to determine the transmission interval and therefore determine when the first vehicle 101 can transmit information back to the second vehicle 102 without causing radar jamming or other interference. However, the multi-vehicle system is also robust against radar jamming due to the reverse radar signal 123 being a modulated signal. In other words, the reverse radar signal 123 is distinguishable, by the front radar system 111 of the second vehicle 102, from its own reflected front directed radar signal due to the modulation of the reverse radar signal 123.

Figure 2:
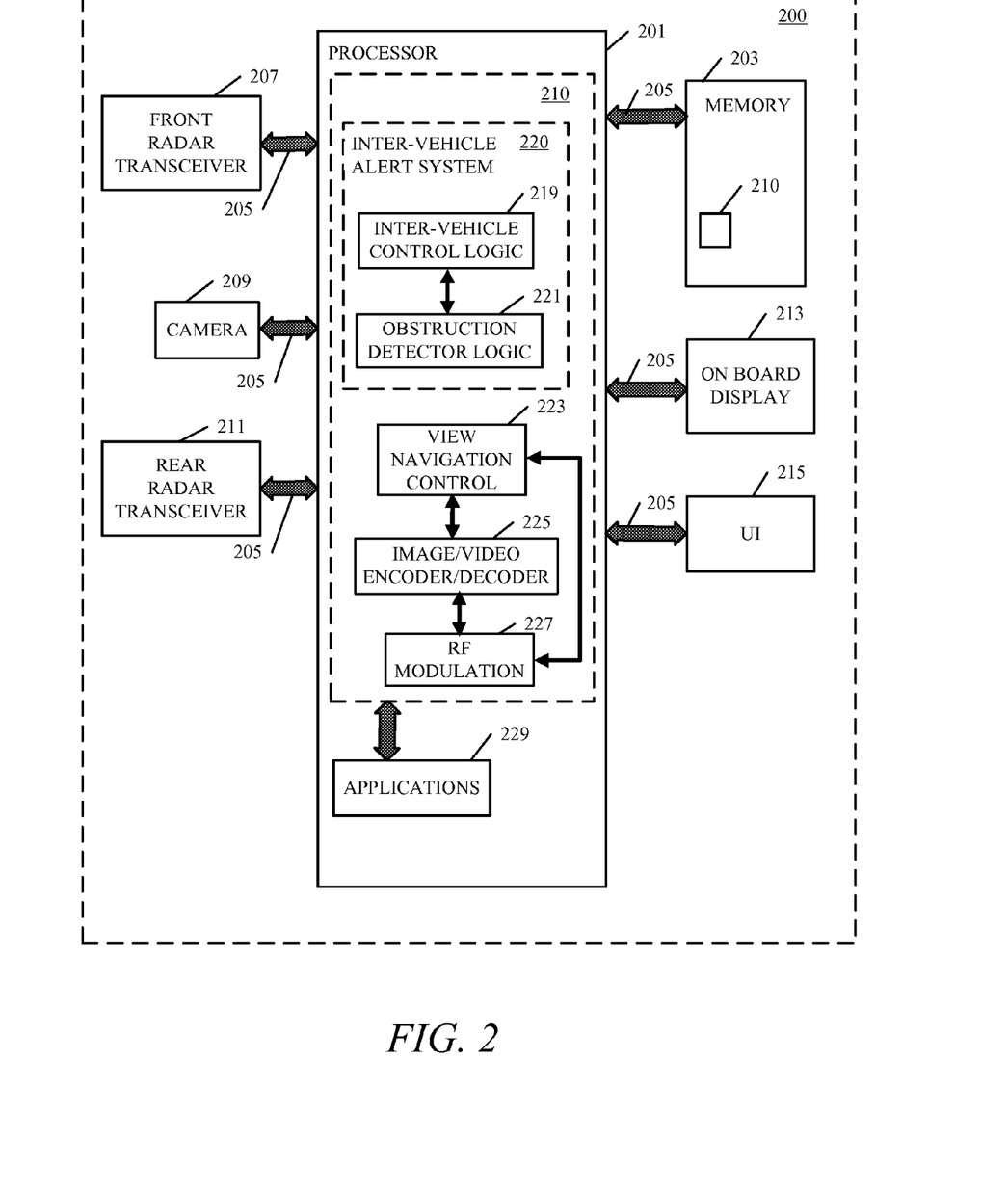
FIG. 2 is block diagram of a vehicle communication system in accordance with an embodiment.

FIG. 2 illustrates a vehicle communication system 200 in accordance with an embodiment. The vehicle communication system 200 is an apparatus that includes at least one processor 201 (i.e. a CPU) that is operatively coupled to various other internal components via a communication bus 205. The communication bus 205 may run throughout the vehicle, providing operative coupling to the various components and circuitry contained within the vehicle. For example, the communication bus 205 may be implemented as a portion of a vehicle wiring harness that runs throughout the vehicle, and that provides power and signaling connections between vehicle components located at various positions such as the dashboard, front or rear of the vehicle, etc. Therefore, in accordance with various embodiments, vehicle communication system 200 components, circuitry, and the like, may be operatively coupled via the communication bus 205. In other words, various intervening components, circuitry, and the like, may exist in between, and/or along, the communication path between any two or more operatively coupled components.

That is, operatively coupled components may have various other hardware and components intervening there-between. Therefore, FIG. 2, as well as other figures provided and described herein, are diagrams provided as examples and are not to be construed as complete schematic diagrams of a particular implementation of a vehicle communication system. FIG. 2 provides an example for the purpose of describing to those of ordinary skill how to make and use the various embodiments. Therefore, FIG. 2 is limited to showing only those components necessary to describe the features and advantages of the various embodiments to those of ordinary skill. It is to be understood that various other components, circuitry, and devices may be necessary in order to implement a complete functional vehicle and/or vehicle communication system and that those various other components, circuitry, devices, etc., are understood to be present by those of ordinary skill.

The communication bus 205 provides operative coupling between the at least one processor 201, front radar transceiver 207, rear radar transceiver 211, camera 209, memory 203, on board display 213 and user interface (UI) 215. The front radar transceiver 207 and rear radar transceiver 211 may be consolidated into a single radar transceiver in some embodiments. However, the vehicle will still have a front facing radar antenna (or radar antenna array) and a rear facing radar antenna (or radar antenna array), in order to provide front collision avoidance and provide the reverse radar signal to provide image or video data and/or other information to other vehicles as described herein.

The at least one processor 201 is operative to execute instructions, written in any suitable programming language, that implements inter-vehicle radar communication logic 210. The inter-vehicle radar communication logic 210 of each vehicle enables a multi-vehicle communication system that can be formed as an ad-hoc network. The inter-vehicle radar communication logic 210 includes an inter-vehicle alert system 220 that obtains obstruction information and sends the information along with still image or video data to other vehicles dispersed in traffic. The inter-vehicle alert system 220 includes inter-vehicle control logic 219 and obstruction detector logic 221. Dispersion of vehicles in traffic can include front and rear vehicles dispersed across several lanes of traffic, and not necessarily in consecutive lines.

The inter-vehicle radar communication logic 210 also includes an image/video encoder/decoder 225 and a radio frequency (RF) modulation block 227. The inter-vehicle radar communication logic 210 may also include view navigation control logic 223, and may also communicate with various other applications 229.

The term "logic" as used herein may include software and/or firmware executing on one or more programmable processors (including CPUs and/or GPUs), and may also include ASICs, DSPs, hardwired circuitry (logic circuitry), or combinations thereof. For the example embodiment illustrated by FIG. 2, the inter-vehicle radar communication logic 210 may be executable instructions stored in memory 203, which is a non-volatile, non-transitory memory.

The obstruction detector logic 221 is operative to receive reflected radar wave data from the front radar transceiver 207 and determine the characteristics of detected objects. For example, the obstruction detector logic 221 may determine that another vehicle in front is slowing down or may determine that there is a stationary obstruction in the road ahead. The obstruction detector logic 221 may provide this information to the inter-vehicle control logic 219 which may then take some appropriate action in response, such as, but not limited to, providing an alert message on the on-board display 213, for example.

The inter-vehicle control logic 219 may control the camera 209 to initiate capturing an image or video, in response to the obstruction detector logic 221 indicating a stationary object, for example, in front of the vehicle. In one embodiment, the obstruction detector logic 221 may detect a slower moving vehicle in front, and provide an alert to the driver to slow down by applying the brakes, or, may send a control signal to a braking system to apply the brakes automatically and reduce speed to avoid collision. The obstruction detector logic 221 may also detect a stationary obstruction as mentioned above, and perform similar alert or braking control signal operations.

The inter-vehicle control logic 219 obtains information about the obstruction from the obstruction detector logic 221, and may provide textual information, such as metadata, to the image/video encoder/decoder 225 and/or to RF modulation block 227. In response to control signals from the inter-vehicle control logic 219, the image/video encoder/decoder 225 may receive image or video data from camera 209 and encode the data. The encoded data is then provided to RF modulation block 227 to be modulated into a "reverse" radar signal, that is, a radar signal transmitted from the vehicle via rear radar transceiver 211. That is, a reverse radar signal is transmitted by the rear radar transceiver 211 for reception by another vehicle located behind the vehicle that captured the image or video. The rear radar transceiver is coupled to a rear radar antenna system that may be located at the rear of the vehicle, but can also be located on the top of the vehicle, inside the vehicle, or on the side of the vehicle, or underneath the vehicle, or integral to the body of the vehicle, for example. The rear radar transceiver or for that matter, any radar transceivers, may be located at any suitable location within the vehicle. The rear radar antenna system (or front radar antenna system) may include one or more antennas, and/or antenna arrays.

As mentioned above, the image or video may also include metadata that provides additional information about the obstruction, for example, whether it is moving or stationary, the obstruction's size based on its radar profile, object speed, distance, or other information. The other vehicle will receive the reverse radar signal, demodulate and decode it and display the image or video and any information contained in metadata, on the vehicle's on board display.

Likewise, the vehicle communication system 200 may receive information from a vehicle located in front. In this case, the front radar transceiver 207 may receive a reverse radar signal from the rear for another vehicle located in front. The image/video encoder/decoder 225 and RF modulation block 227 will demodulate and decode the received reverse radar signal to obtain any image or video data and any associate metadata that may be present in the radar signal. The image, video, or text information is then provided to on board display 213 via the communication bus 205.

As mentioned briefly above, the embodiments provide the advantage of an inter-vehicle alert system with navigable video look ahead that operates to establish video communication in an ad-hoc manner. That is, any number of vehicles can form an ad-hoc network in a traffic situation, such as the first vehicle 101 and second vehicle 102 shown in FIG. 1. A driver may use view navigation control logic 223 in conjunction with UI 215, in some embodiments, to navigate and obtain an image or video from one or more vehicles in front, so as to be able to view the obstruction 117. Therefore, image data or video data, and associated metadata may be transmitted over a series of reverse radar signals to arrive at a rear vehicle in a stream of traffic. The various vehicles in the stream of traffic may act as a network relay point to receive and pass on the data to the next vehicle to the rear (and/or to the front or side in other embodiments). The view navigation control logic 223 sends a request via the radar signal to obtain the view of, for example, a front-most vehicle. That is, in response to activation of the view navigation control logic 223 via UI 215 to navigate the view, the view navigation control logic 223 may send a control signal, by modulating a front directed radar signal with the control signal. The control signal may be received at the rear of the front-most vehicle via relay from an ad-hoc network formed of several vehicles. This feature may operate with or without obstruction detection by the front-most vehicle. That is, the requesting vehicle can obtain "x-ray like" vision and be able to see past proximate vehicles in its path to a suitable view, such as the open roadway in front of a front-most vehicle. The view navigation control logic 223 may provide a joystick like control system that moves the view further and further ahead, or behind, as the driver pushes a button or moves a paddle control. The button control or paddle control may be located conveniently on the steering wheel of the vehicle similar to cruise control or stereo sound controls on currently existing vehicles. However, the UI 215 may be implemented in any suitable manner such as via a track ball mouse, touch sensitive elements, physical switches, voice activated command, gesture command, etc. The on board display 213 may provide a touchscreen functionality that is also therefore operatively coupled, via the communication bus 205 and at least one processor 201, to the user interface 215 and the view navigation control logic 223. That is, the on board display 213 may be integrated with the UI 215 to provide a graphical user interface (GUI) with touchscreen capability in lieu of, or in addition to, other physical controls to provide selection input and view navigation functionality.

Figure 3:
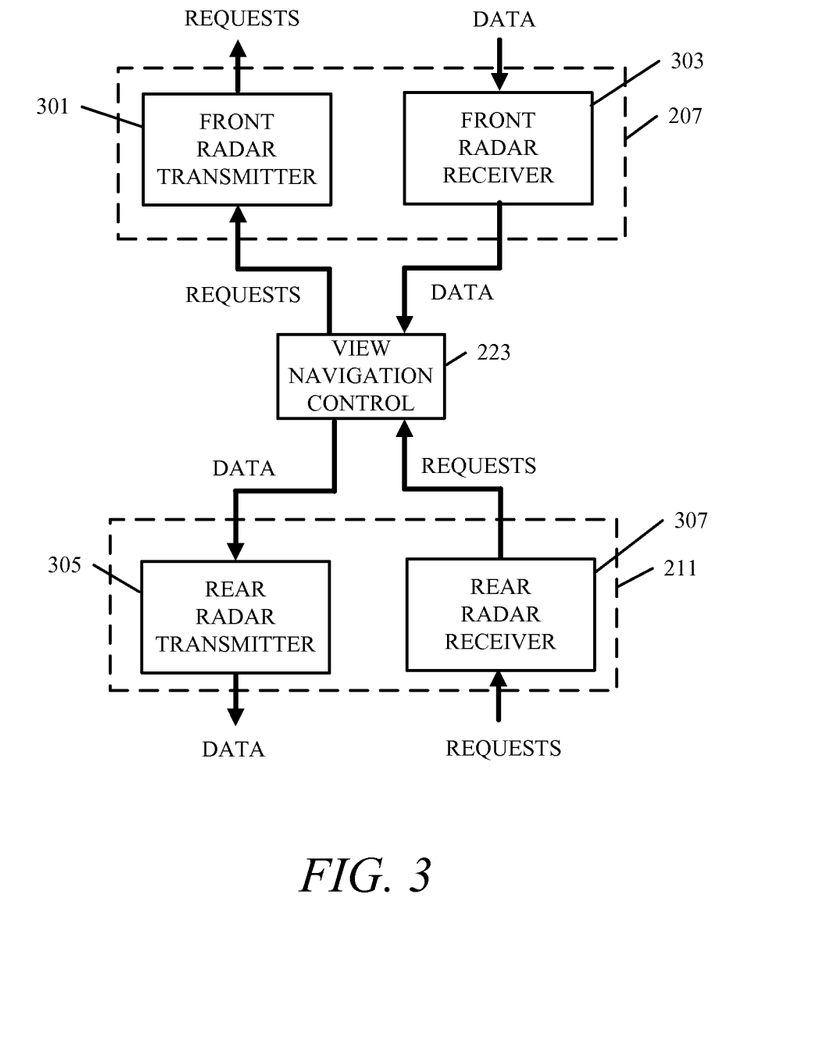
FIG. 3 is a block diagram showing request and data flow between the front and rear radar transceivers and the view navigation control shown in FIG. 2.

FIG. 3 is provided to show how data and requests flow between the view navigation control logic 223, the front radar transceiver 207 and the rear radar transceiver 211. In FIG. 3 the front radar transceiver 207 is shown as having a front radar transmitter 301 and a front radar receiver 303; similarly the rear radar transceiver 211 is shown as having a rear radar transmitter 305 and a rear radar receiver 307. However, it is to be understood that the various embodiments may utilize a single radar transceiver and a control system to control transmission and reception between a front facing antenna or antenna array, and a rear facing antenna or antenna array. The terms "front" and "rear" as used herein refer to the front and rear of a vehicle such as the conventionally described front and rear of a car, truck or boat, for example.

As shown in FIG. 3, navigation by a driver of another vehicle, that may be in a line or stream of traffic, results in that vehicle's radar system sending one or more requests to the rear radar receiver 307. Those requests are passed to the view navigation control logic 223, which handles the requests. For example, if the request is to view the road from another vehicle, located further forward in the line of traffic, the view navigation control logic 223 will pass the request on to the next car in front via the front radar transmitter 301. In this example, the front radar receiver 303 will then receive data, such as control, image and/or video data, from the vehicle in front. The view navigation control logic 223 will handle the data by for example, allowing it to be decoded and displayed on the vehicle on-board display 213, or, adding new or additional data, and/or passing it through to the vehicle to the rear via the rear radar transmitter 305.

The view navigation control logic 223 may therefore be used by the vehicle driver to obtain image or video from an on-board camera of one to several vehicles in front, in a line of traffic, and navigate the various available views using an on-board display.

Figure 4:
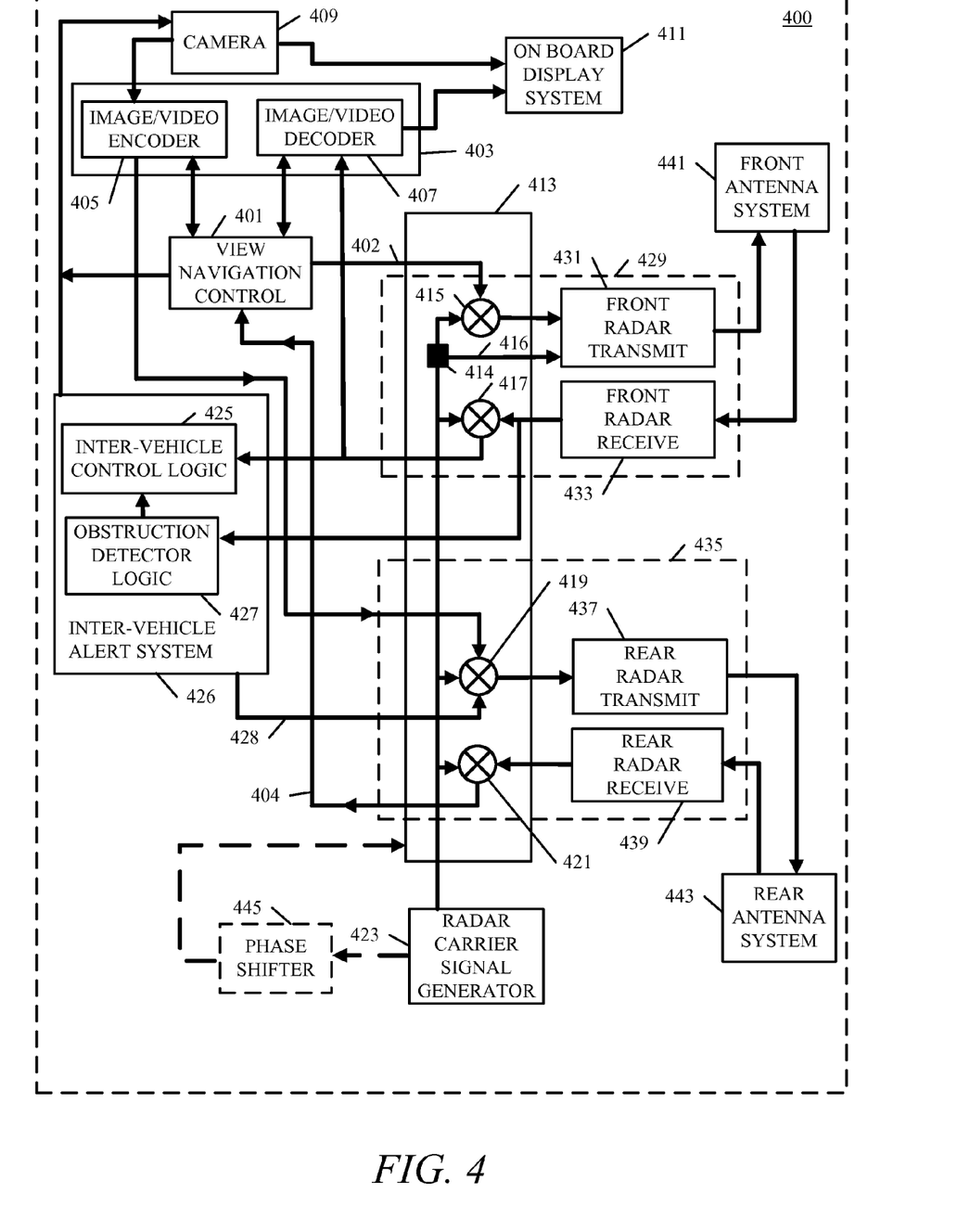
FIG. 4 is block diagram of a vehicle communication system in accordance with an embodiment.

Further details of a vehicle communication system 400, in accordance with another embodiment, is shown in FIG. 4. The vehicle communication system 400 is an apparatus that includes a front radar transceiver 429 which is coupled to a front antenna system 441. A rear radar transceiver 435 is coupled to a rear antenna system 443. In some embodiments, a single transceiver may be used along with appropriate RF switching and/or other RF hardware, to couple the single radar transceiver to the front antenna system 441 and the rear antenna system 443. The antenna system 441 and the antenna system 443 include any necessary RF switching and/or other RF hardware needed to couple the transceivers 429 and 435 to one or more antennas or one or more antenna arrays. That is, antenna system 441 and antenna system 443 may include one or more antennas and/or antenna arrays and any other required RF hardware.

In the example embodiment of FIG. 4, the view navigation control logic 401 interfaces with the front radar transceiver 429 and a rear radar transceiver 435, via radio frequency (RF) modulation circuitry 413. The view navigation control logic 401 may provide a control and data signal 402 to a vehicle located in front, via the mixer 415 which mixes the control and data signal 402 with an intermediate frequency, i.e. the radar carrier signal provided by radar carrier signal generator 423. The control and data signal 402 may include a request for image or video data from a vehicle located somewhere in front in a line of traffic. In some embodiments, the vehicle communication system 400 may also include a phase shifter 445, to provide for example, a 90° phase shifted carrier to enable Quadrature modulation such as Quadrature Amplitude Modulation (QAM) or Quadrature Phase Shift Keying (QPSK). The mixer 415 provides a modulated radar signal to the front radar transmit front end 431 (i.e. the transceiver transmit front end) which includes necessary amplifiers and/or additional modulation in some embodiments. The front radar transmit front end 431 also uses the un-modulated radar carrier signal 416 for operation of obstruction detection and collision avoidance features of the vehicle communication system 400. The RF modulation circuitry 413 includes RF switching logic 414 that switches between the un-modulated radar carrier signal 416 and the modulated radar carrier signal from mixer 415 as needed. The terminology "un-modulated radar carrier signal" as used herein refers to the radar carrier signal that is not modulated with an information or data signal. In other words, the radar carrier may still be "modulated" as necessary for operation of the radar system, but does not include any data and is not modulated for the purpose of transmitting data. Likewise, "modulation" as used herein refers to modulation for the purpose of including an information or data signal in the radar signal. That is, the radar carrier signal is "modulated" (as used herein) when an information or data signal is included in the radar signal.

For example, in some embodiments, the RF switching logic 414 may enable transmission of control signals and/or data only during silent intervals during which the un-modulated radar carrier signal 416 is not transmitted for collision avoidance. The front radar receive front end 433 may provide reflected wave information to obstruction detector logic 427 which processes the information and provides data to inter-vehicle control logic 425 of an inter-vehicle alert system 426 if appropriate.

The inter-vehicle alert system 426 includes inter-vehicle control logic 425 and obstruction detector logic 427 which are operatively coupled. The obstruction detector logic 427 obtains the radar reflected signal to determine whether there is an obstruction such as a stationary object requiring a stop, or evasive maneuver, or a slower moving vehicle requiring a reduction in speed. In response to detecting such an obstruction by the obstruction detector logic 427, the inter-vehicle control logic 425 will initiate operation of the camera 409 to obtain images and/or video data. A control signal 428 may be modulated with the radar carrier via mixer 419, to transmit to a vehicle in back via the rear radar transmit front end 437. The control signal 428 may inform the vehicle communication system of the rear located vehicle that image and/or video data is about to be transmitted, or the control signal 428 may be sent along with the image and/or video data. For example, video data from the image/video encoder 405 (of encoder/decoder 403) may be mixed with the radar carrier along with the control signal 428 via mixer 419, and provided to the rear radar transmit front end 437. The rear vehicle will receive and demodulate the radar signal to obtain data frames, such as at least one video data frame, and display the data on its on-board display system. For example, in a pulsed radar system a full or portion of a video data frame may be used to modulate the radar pulse prior to transmission. Each radar pulse may include at least one video data frame such that the video is received as the radar pulses are transmitted from the sending vehicle.

Likewise, the vehicle communication system 400 can receive image/video data and/or control signaling from a front located vehicle via the front radar receive front end 433. If the radar signal is modulated, then the signal will be demodulated via the mixer 417 to obtain a data or control signal. If image/video data is present it will be decoded by the image/video decoder 407 and sent to the on-board display system 411, unless a control signal provided to the inter-vehicle control logic 425 indicates that the data is to be passed on to another vehicle located to the rear. That is, the inter-vehicle control logic 425 operates in conjunction with view navigation control blocks of other surrounding vehicles to implement an ad-hoc inter-vehicle network. For example, a vehicle located to the rear may request video data from a vehicle located in the front. In this example, the vehicle communication system 400 serves as an intermediary and passes the video data, and any related control data or metadata, to the requesting vehicle. For example, the rear radar receive front end 439 signal may be demodulated by mixer 421 to obtain control signal 404 which is provided to the view navigation control logic 401. If the requesting vehicle requests video from the vehicle communication system 400, the view navigation control logic 401 may initiate the camera 409 to obtain video, and send encoded video frames from the image/video encoder 405. Mixer 419 will then modulate the radar carrier with the video frame data and provide it to rear radar transmit front end 437 to transmit to the rear vehicle.

However, if the requesting vehicle requests video from another vehicle located in front, the view navigation control logic 401 will provide control and data signal 402 to mixer 415 to forward the request to the front vehicle via front radar transmit front end 431. When the front vehicle returns the video data, the front radar receive front end 433 signal is demodulated via mixer 417 and the inter-vehicle control logic 425 receives an indication that the data is for the rear vehicle. The video data is then forwarded via data and control signal 428 to mixer 419, to modulate the radar carrier and send it to the rear vehicle via rear radar transmit front end 437. The data may also include encoded video from image/video encoder 405. That is, some image/video data from the vehicle communication system 400 may be sent along with image/video data from the front located vehicle by modulated the radar carrier with both. The RF modulation circuitry 413 may also include interleaving, encoding, repeat transmissions, and/or other digital transmission techniques to enhance the robustness of transmitted and received data in some embodiments.

Figure 5:
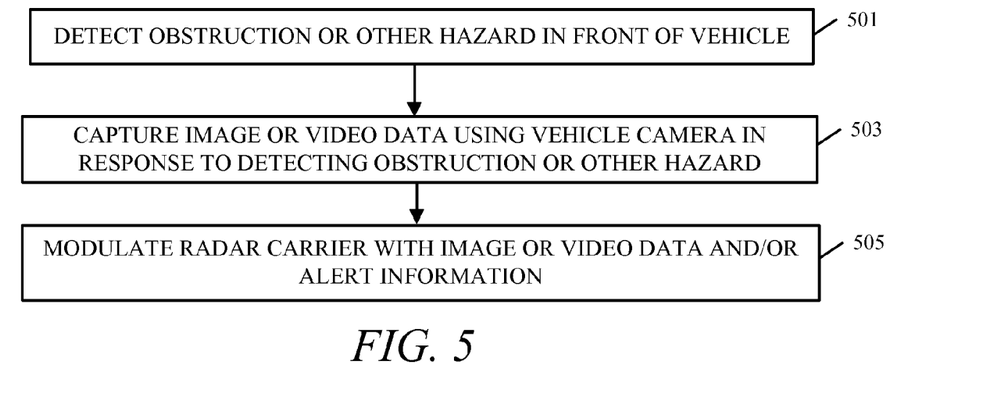
FIG. 5 is a flow chart showing operation of an inter-vehicle alert system in accordance with various embodiments.
Figure 6:
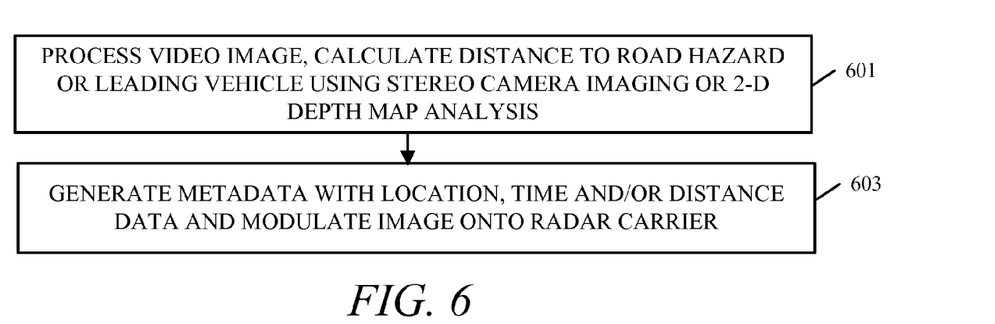
FIG. 6 is a flow chart showing additional operations of the inter-vehicle alert system of FIG. 5 in accordance with another embodiment.
Figure 7:
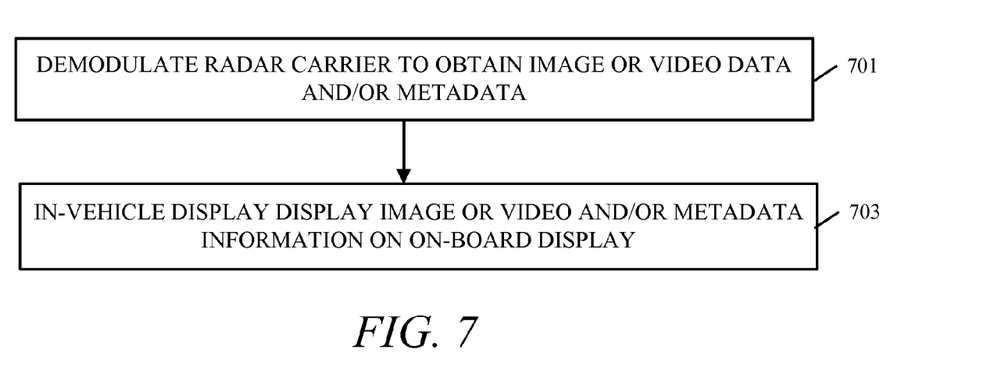
FIG. 7 is a flow chart showing operation of the inter-vehicle alert system when receiving image, video and/or metadata in accordance with an embodiment.

The flowcharts provided in FIG. 5, FIG. 6 and FIG. 7 illustrate the operations described above for the inter-vehicle alert system of a moving vehicle. In FIG. 5 block 501, the inter-vehicle alert system detects an obstruction or other hazard (such as a slower moving vehicle) in front of the moving vehicle. In block 503, the inter-vehicle alert system initiates capture of image or video data using the vehicle camera in response to detecting the obstruction or other hazard. In block 505 the radar carrier is modulated with the image or video data and/or metadata including alert information. FIG. 6 shows that further processing may be performed on the image or video data. For example, in block 601 the video image may be processed so that distance to the road hazard or a leading vehicle may be determined using stereo camera imaging or depth map analysis. However, this information may also be determined by the radar system obstruction detection logic. In 603, metadata is generated for the image or video data. The metadata may include location, time, distance, etc., and is modulated onto the radar carrier along with the image or video data.

FIG. 7 illustrates the process of receiving data from another vehicle located in front. For example, in block 701 the radar carrier is demodulated to obtain image or video data and/or metadata. In block 703 the image, video and/or metadata information is displayed by the vehicle's on-board display.

Figure 8:
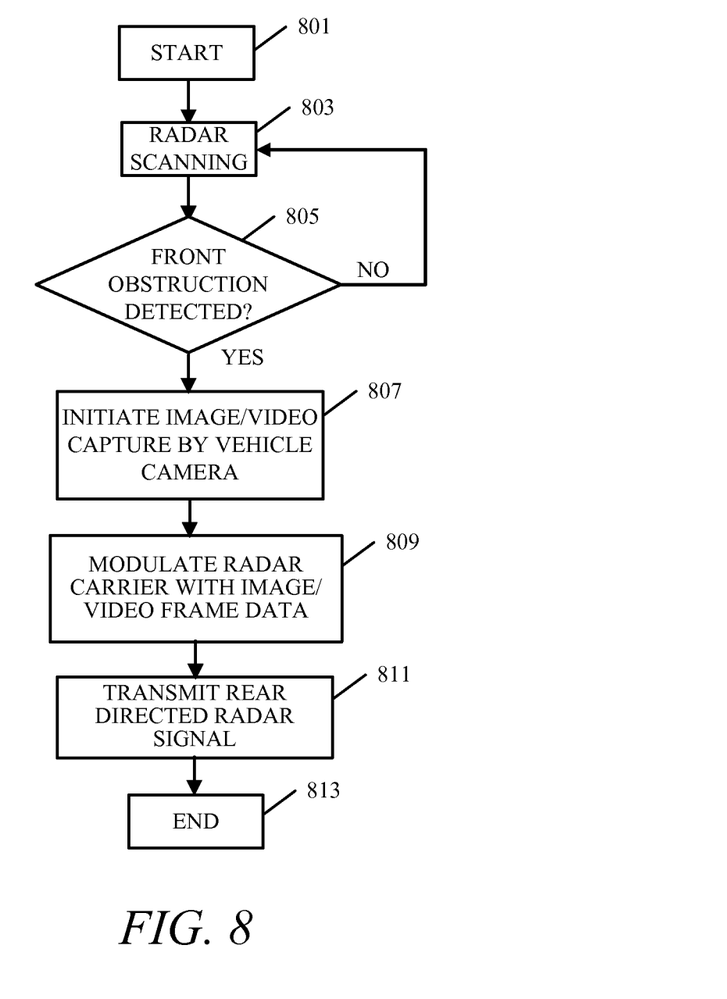
FIG. 8 is a flowchart showing operation of an inter-vehicle alert system in accordance with various embodiments.

FIG. 8 provides an operation process for the inter-vehicle alert system as illustrated in FIG. 2 and FIG. 4. The operation begins in block 801 and radar scanning for obstructions begins as shown in block 803. If a front obstruction is detected in decision block 805, the inter-vehicle alert system initiates image or video capture by the vehicle camera in block 807. When no obstruction is detected, the radar scanning continues in block 803. This may involve sending a radar signal at predetermined intervals. When an image or video is captured as shown in block 807, the radar carrier is modulated with the image or video data in block 809 and transmitted to a rear vehicle via the rear directed radar signal as shown in block 811. The process then ends in block 813.

Figure 9:
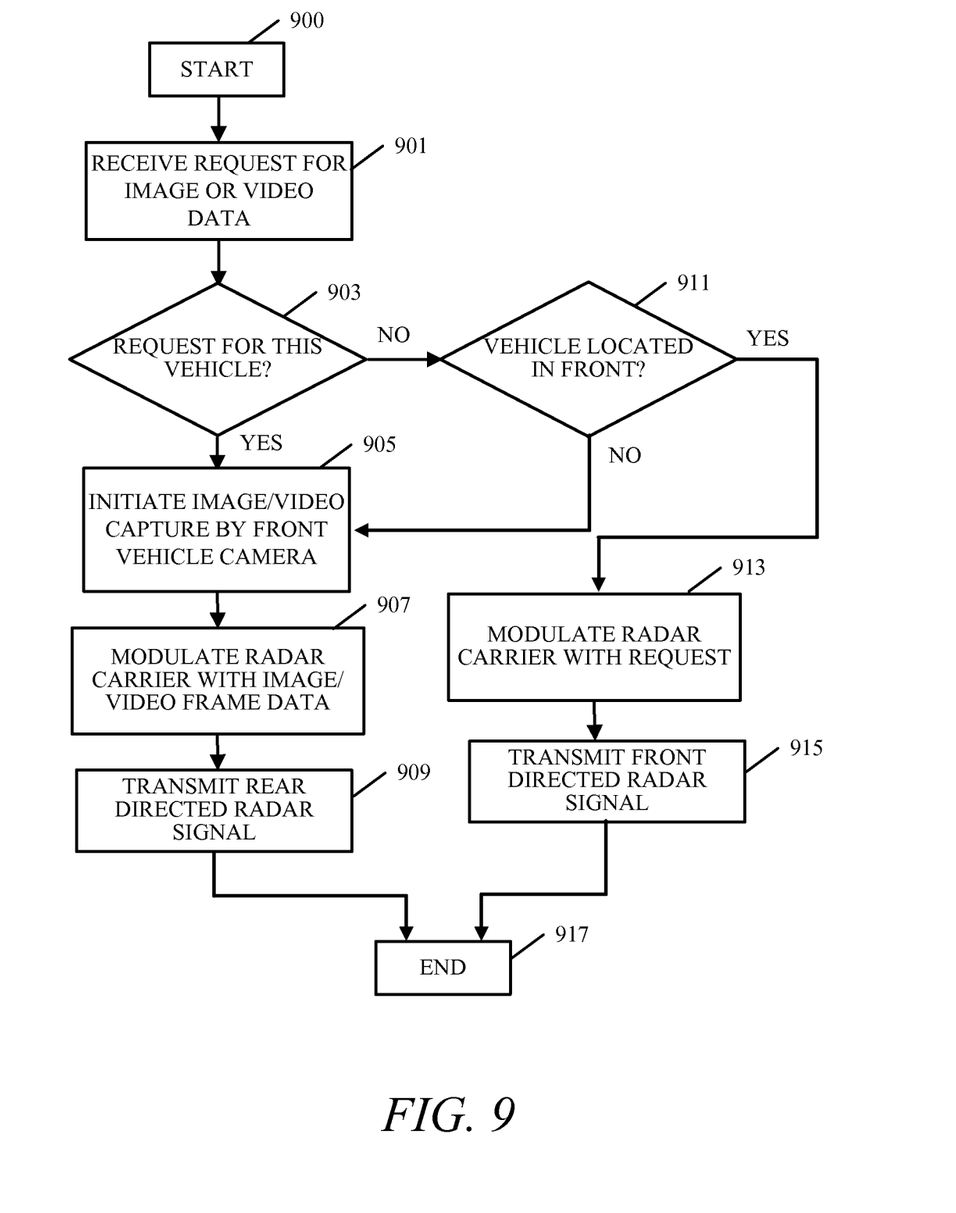
FIG. 9 is a flowchart showing operation of view navigation control and inter-vehicle control logic when receiving a request in accordance with various embodiments.
Figures 10, 11:
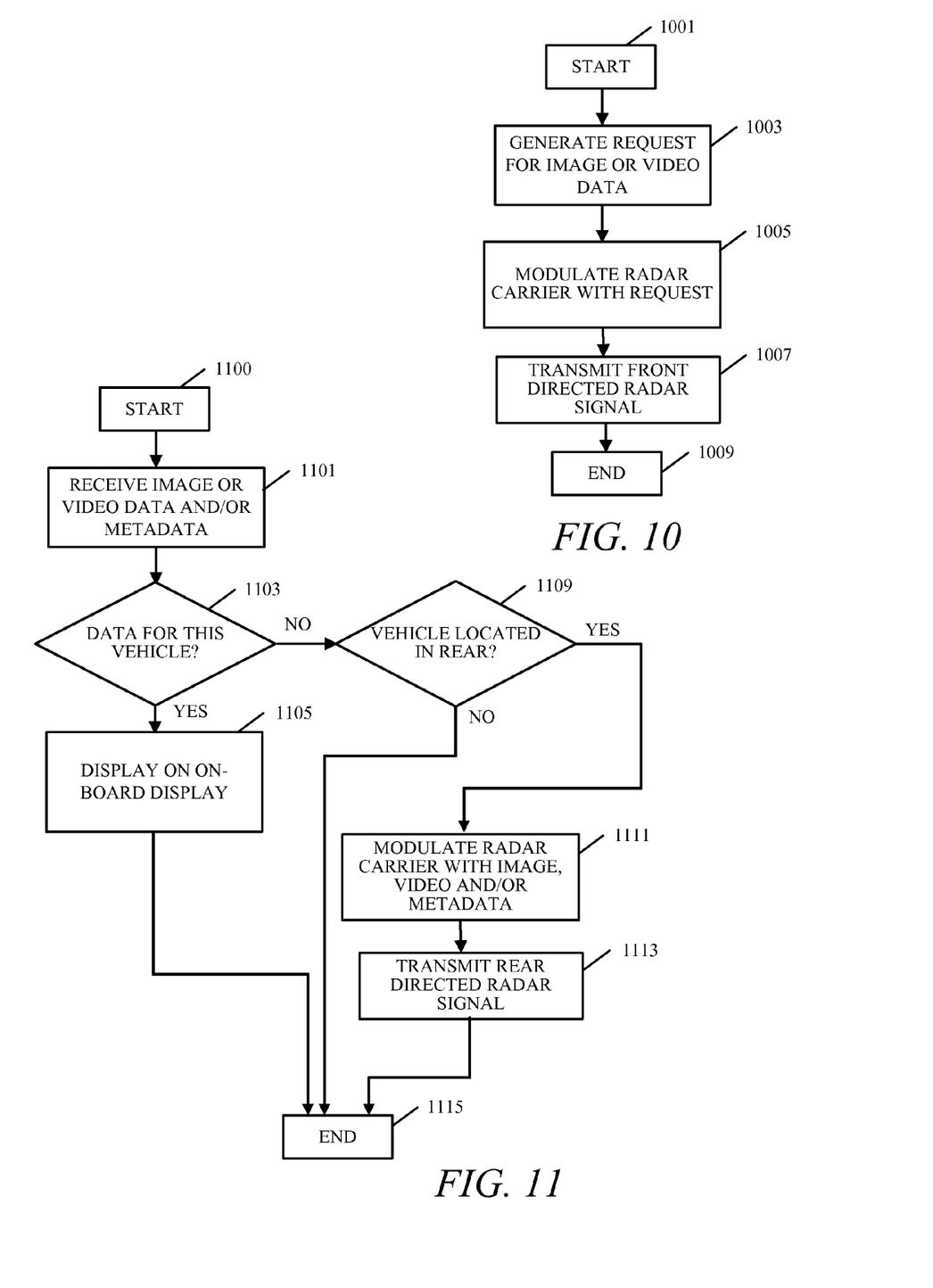
FIG. 10 is a flowchart showing operation of view navigation control when generating a request in accordance with various embodiments.
FIG. 11 is a flowchart showing operation of view navigation control and inter-vehicle control logic when receiving image, video and/or metadata in accordance with various embodiments.

FIG. 9, FIG. 10 and FIG. 11 illustrate operations of a view navigation control and inter-vehicle control logic as described with respect to FIG. 2, FIG. 3 and FIG. 4. FIG. 9 illustrates how requests for image or video data are handled. The operation begins in block 900 and a request for image or video data is received in block 901. As discussed above, the rear radar receiver radar signal may be demodulated to obtain the request. The request may be for the present vehicle or may be for another vehicle located further in front in the line of traffic. This determination is made in decision block 903. The determination may be made by reading addressing information that may be contained within the request. The addressing information may be passed between vehicles in a discovery phase where the respective radar systems detect and identify vehicles located in the front and/or to the rear. This identification enables the view navigation control to scroll up to various vehicles located to the front to obtain video data from them. Therefore, if the request is not for the vehicle that received the request, as shown in decision block 903, the receiving vehicle may use its front located radar to determine if another vehicle is located in front as shown in decision block 911. If another vehicle is present, the radar carrier is modulated by the request in block 913 and transmitted to the front vehicle via the front directed radar signal as shown in block 915. This ends the process as block 917. However, if the received request pertains to the receiving vehicle in decision block 903, then the camera is initiated to capture the requested image or video in block 905. In block 907, the radar carrier is modulated with the image/video data and in block 909 is transmitted via the rear directed radar signal. The process then ends in block 917. Process blocks 909 and 915 may include considering the timing of radar signals received from the targeted recipient. Because radar transceivers may operate in a time domain duplex (TDD) manner, the radar transceivers may only be able to receive or transmit at a given time, but not both. Therefore, the radar transceiver/s may consider when signals were received from the targeted recipient vehicle and transmit during idle times accordingly. For example, the distance to the targeted recipient vehicle is known from the radar. Based on the time a signal is received from the targeted recipient vehicle and the distance, a time can be estimated when the radar transceiver of the targeted recipient vehicle is transmitting. That is, in process blocks 909 and/or 915, the outgoing radar signal can be delayed so that it will arrive at the targeted recipient during a time when the targeted recipient transceiver is not transmitting. The amount of power transmitted in process blocks 909 and/or 915 may also be adjusted based on the distance to the target vehicle. For example, power may be increased if the vehicle is further away, while power may be decreased for a closer vehicle to reduce the potential interference with other vehicles in the vicinity.

FIG. 10 illustrates how requests are generated and sent by the view navigation control. The process begins in block 1001 and the request for image or video data is generated in block 1003. The radar carrier is then modulated with the request in block 1005, and transmitted to the vehicle in front via the front directed radar signal in block 1007. The process then ends in block 1009. When the data is received, the process of FIG. 11 is applicable.

The process, shown in FIG. 11, begins in block 1100, and image or video and/or metadata is received in block 1101. This is accomplished by demodulating the radar signal received at the front of the vehicle. If the data is for the receiving vehicle in decision block 1103, the data is displayed on the on-board display in block 1105 and the process ends in block 1115. If the data is not for the receiving vehicle in decision block 1103, the receiving vehicle may check using radar if there is another vehicle present to the rear in decision block 1109. If not, the process may end in block 1115 and the data can be ignored. If yes, then the radar carrier will be modulated with the data in block 1111 and transmitted via the rear directed radar signal in block 1113. The process then ends as shown in block 1115.

Various hardware and software implemented embodiments have been described above. However, the various embodiments also include computer readable memory that may contain executable instructions, for execution by at least one processor, that when executed, cause the at least one processor to operate in accordance with the vehicle communication system functionality herein described, including the inter-vehicle alert system and/or the view navigation control. The computer readable memory may be any suitable non-volatile, non-transitory, memory such as, but not limited to, programmable chips such as EEPROMS, flash ROM (thumb drives), compact discs (CDs) digital video disks (DVDs), etc., that may be used to load executable instructions or program code to other processing devices or electronic devices such as those that may benefit from the features of the herein described embodiments.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. An apparatus comprising:
   a video encoder operatively coupled to a camera;
   radio frequency modulation circuitry, operatively coupled to the video encoder, the radio frequency modulation circuitry operative to modulate a radar signal to include video data;
   a radar transmitter, operatively coupled to the radio frequency modulation circuitry, the radar transmitter operative to transmit a radar signal including the video data; and
   inter-vehicle control logic, operatively coupled to a radar receiver and to the camera, the inter-vehicle control logic operative to control the camera to initiate capturing the video data, the video data including at least one video data frame.

2. The apparatus of claim 1, comprising:
   radio frequency demodulation circuitry, operatively coupled to a radar receiver; and
   a video decoder, operatively coupled to the radio frequency demodulation circuitry, the video decoder operative to decode video data contained in a radar signal demodulated by the radio frequency demodulation circuitry.

3. A vehicle including the apparatus of claim 2, wherein the radar transmitter is coupled to a first antenna array oriented to transmit a radar signal from a rear of a vehicle; and
   wherein the radar receiver is coupled to a second antenna array oriented to receive an incoming radar signal directed to a front of the vehicle.

4. A vehicle including the apparatus of claim 1, wherein the radar transmitter is coupled to a first antenna array oriented to transmit a radar signal from a rear of a vehicle.

5. A method comprising:
   encoding a video signal in response to detecting an obstruction in the path of a moving vehicle using an on-board radar system having an antenna array oriented at the moving vehicle's front;
   modulating a radar signal to include a portion of the video signal; and
   transmitting the radar signal to a second vehicle via another antenna array oriented to transmit from the moving vehicle's rear.

6. The method of claim 5, comprising:
   receiving a second radar signal from the second vehicle;
   determining a distance of the second vehicle;
   determining an available transmission time based on the distance of the second vehicle and a time characteristic of the second radar signal; and
   transmitting the radar signal to the second vehicle during the available transmission time.

7. The method of claim 5, comprising:
   demodulating a radar signal intercepted at the antenna array oriented at the moving vehicle's front to obtain at least a portion of a second video signal transmitted from a third vehicle;
   decoding the portion of the second video signal; and
   displaying the portion of the decoded video signal on an on-board display system.

8. The method of claim 7, comprising:
   decoding information related to an obstruction detected by the third vehicle, the information decoded as metadata contained in the portion of the video signal; and
   displaying the information on the on-board display system.

9. The method of claim 8, comprising:
   displaying an alert on the on-board display system, the alert related to the detected obstruction, detected by the second vehicle.

10. The method of claim 7 comprising:
    modulating a radar signal to include at least a portion of the video signal captured in response to detecting the obstruction, and at least a portion of the second video signal; and
    transmitting the radar signal to the second vehicle via the antenna array oriented at the moving vehicle's rear.

11. The method of claim 5, further comprising:
    detecting, a radar signal sent from the second vehicle; and
    adjusting the modulated radar signal power level to be proportional to a power level of the radar signal sent from the second vehicle.

12. The method of claim 11, further comprising:
    adjusting the modulated radar signal power level based on a radar cross section of the moving vehicle's rear.

13. The method of claim 5, further comprising:
    detecting a distance of the second vehicle from the moving vehicle's rear via the radar signal; and
    adjusting the power of the radar signal to be proportional to the distance of the second vehicle.

14. An apparatus comprising:
    radio frequency modulation circuitry, operatively coupled to a video encoder, a video decoder, and at least one radar transceiver, the radio frequency modulation circuitry operative to modulate a radar signal to include video data and to demodulate a radar signal to obtain video data; and
    view navigation control logic operatively coupled to a camera and to the radio frequency modulation circuitry, the view navigation control logic operative to send and receive control signals and video data to and from a plurality of vehicles, and to control video data displayed on a vehicle on-board display system, the video data obtained from the plurality of vehicles.

15. A method comprising:
    sending a request for video data as a request signal contained in a first modulated radar signal modulated by the request signal, from a first vehicle radar transceiver to a second vehicle radar transceiver;
    receiving, in response to the request, a second modulated radar signal from the second vehicle radar transceiver, the video data contained in the second modulated radar signal; and
    demodulating the second modulated radar signal to obtain the video data.

16. The method of claim 15, comprising:
    receiving a third modulated radar signal from a third vehicle radar transceiver;
    demodulating the third modulated radar signal to obtain a second request for video data as a second request signal;
    modulating a radar signal using the second request signal; and
    transmitting the radar signal from the first vehicle radar transceiver to a third vehicle radar transceiver.

17. The method of claim 16, wherein transmitting the radar signal from the first vehicle radar transceiver to a third vehicle radar transceiver further comprises:
    transmitting the radar signal from a front facing antenna array of the first vehicle.

18. The method of claim 16, further comprising:
    modulating the radar signal using the second request signal and video data obtained from a vehicle camera.

19. The method of claim 15, further comprising:
    displaying the video data on a vehicle on-board display system.

20. An apparatus comprising:

a video encoder operatively coupled to a camera;

radio frequency modulation circuitry, operatively coupled to the video encoder, the radio frequency modulation circuitry operative to modulate a radar signal to include video data;

a radar transmitter, operatively coupled to the radio frequency modulation circuitry, the radar transmitter operative to transmit a radar signal including the video data;

radio frequency demodulation circuitry, operatively coupled to a radar receiver; and a video decoder, operatively coupled to the radio frequency demodulation circuitry, the video decoder operative to decode video data contained in a radar signal demodulated by the radio frequency demodulation circuitry, wherein the radar transmitter is coupled to a first antenna array oriented to transmit a radar signal from a rear of a vehicle, and wherein the radar receiver is coupled to a second antenna array oriented to receive an incoming radar signal directed to a front of the vehicle.

\* \* \* \* \*